US005971273A

United States Patent [19]

Vallaire

[11] Patent Number: 5,971,273

[45] Date of Patent: Oct. 26, 1999

[54] AUTOMATED FLORIST SYSTEM ALLOWING DIRECT CONTACT WITH DELIVERING FLORIST

[76] Inventor: Milton E. Vallaire, 3321 N. Villere St., New Orleans, La. 70117

[21] Appl. No.: 08/936,234

[22] Filed: Sep. 24, 1997

Related U.S. Application Data

[60] Provisional application No. 60/026,675, Sep. 25, 1996.

[51] Int. Cl.[6] ................................ G06K 5/00; G06K 7/08

[52] U.S. Cl. .......................... 235/381; 235/382; 235/385; 705/26; 340/825.25

[58] Field of Search .................................... 235/381, 382, 235/383, 385; 340/825.25; 705/26, 25

[56] References Cited

U.S. PATENT DOCUMENTS

| | | | |
|---|---|---|---|
| 4,311,227 | 1/1982 | Watkins | 194/4 |
| 4,953,363 | 9/1990 | Primozic | 62/255 |
| 5,102,715 | 4/1992 | Zetterquist | 428/137 |
| 5,146,709 | 9/1992 | Iseki | 47/41.01 |
| 5,158,155 | 10/1992 | Domain et al. | 235/383 |
| 5,360,134 | 11/1994 | Falk et al. | 221/2 |
| 5,386,462 | 1/1995 | Schlamp | 379/106 |
| 5,440,479 | 8/1995 | Hutton | 364/401 |
| 5,445,295 | 8/1995 | Brown | 235/381 |
| 5,450,938 | 9/1995 | Rademacher | 194/206 |
| 5,472,116 | 12/1995 | Barbe et al. | 221/126 |
| 5,511,646 | 4/1996 | Maldanis et al. | 194/217 |
| 5,513,117 | 4/1996 | Small | 235/381 |
| 5,580,840 | 12/1996 | Harms et al. | 504/115 |
| 5,596,501 | 1/1997 | Comer et al. | 235/381 |
| 5,678,421 | 10/1997 | Maynard et al. | 62/407 |
| 5,734,151 | 3/1998 | Brown et al. | 235/381 |

OTHER PUBLICATIONS

"Tools of the Trade"—Ad of 24–Hours Flower, Inc.

*Primary Examiner*—Thien Minh Le
*Assistant Examiner*—Daniel St. Cyr
*Attorney, Agent, or Firm*—C. Emmett Pugh; Pugh/Associates

[57] ABSTRACT

An automated florist system, including an associated cooler (20, FIG. 1) and order taking control unit (22, FIG. 2) for automated vending and order placements specifically for flowers and gift items. The system, with the control unit being pre-programmed using appropriate logic (FIG. 3), allows a walk-up or drive-up customer to select from a variety of pre-made flower arrangements from discrete cells equipped with the necessary refrigeration for immediate purchase, or, alternatively, a selection may be made, and information entered, for remote delivery at a specified time and place (note displayed "order form" of FIG. 5). Further, the operating, host florist of the vending system can remotely monitor and conduct all business with the vending machine from the operating florist's shop (FIG. 4), with the sole exception of stocking the machine with items for immediate purchase; while the sending of an order to an affiliated florist for a distant delivery is fully automated; see FIG. 6.

24 Claims, 6 Drawing Sheets

CONSUMER SALES FLOW PROGRAM

HOST FLORIST DATA FLOW

51

FIG.5

ORDER FORM:
OPTION #2 SAMPLE ORDER

*FAX ORDER DIRECT*

****************************************************

ORDER DATE: 05/09/97 DELIVERY DATE: 05/11/97
SPECIAL INSTRUCTIONS:
SEND TO: MONALISA TINDOAY TEL:[899] 735-3316
EXT:

DELIVERY ADDRESS: 225 BIG STAKES PKWY.
C/O BURNS & ALLEN
SAN FRANCISCO, CA. 8976

DESCRIPTION:

1st., ARRANGEMENT OF 1 DZ. RED ROSES
2nd., " " 1 DZ. ANY COLOR

| | | |
|---|---|---|
| AMOUNT IN US DOLLARS: | $ | 50.00 |
| DELIVERY CHARGE: ........................ | $ | 5.00 |
| SUB TOTAL: .............................. | $ | 55.00 |
| LOCAL SALES TAX . 6%... | | 3.30 |
| TOTAL IN US DOLLARS:..... | $ | 58.30 |

CARD MESSAGE:
HAPPY BIRTHDAY CARD
I LOVE YOU,
CHUCK

COMMENTS: IF THERE IS A PROBLEM WITH DELIVERY CONTACT CUSTOMER: CHUCK JOHNSON & SHERIDAN PLANTS & FLOWERS

***************************************************

CUSTOMER INFORMATION:

FIRST MIDDLE LAST
NAME:
YOUR HOME WORK
TEL NO. ( ) - ( ) -
ADDRESS:
CITY: STATE: ZIP:

AT THIS POINT CUSTOMER IS ASKED TO SELECT CASH OR CREDIT CARD
PRESS 1 FOR CASH OR 2 FOR CREDIT

AUTOMATED FLORIST SYSTEM ALLOWING DIRECT CONTACT WITH DELIVERING FLORIST

REFERENCE TO RELATED APPLICATION

This utility patent application is based on co-pending, provisional patent application Ser. No. 60/026,675 filed Sep. 25, 1996 entitled "Automated Florist System", the priority benefit of which is claimed for the instant utility application.

TECHNICAL FIELD

The invention is directed to an automated vending and order placement machine and related system specifically for flowers and other gift items typically handled by a florist shop which would typically be available to a customer on a twenty-four hour basis. More particularly, the invention makes available on a twenty-four hour basis items, such as flowers and gifts, for immediate purchase as well as for remote delivery and has the capabilities of transferring a delivery order to the proper person to conduct the remote delivery at a user designated time and place.

BACKGROUND ART

Currently florist customers generally must visit a florist shop or call during the shop's business hours in order to obtain service. However, given the consuming public's demand for "twenty-four hour" service due to complex and busy schedules, a florist shop, that is open for business only eight or ten hours a day, is missing many opportunities to serve their clientele at the clientele's convenience.

Some efforts have been made at providing floral vending machines. These machines are essentially the same as any other refrigerated vending machine in that they hold compartments with flower arrangements which are accessible immediately for purchase. However, one of the greatest services a florist can provide is the delivery of flowers, often to a location at a great distance away. These vending machines are not capable of such delivery applications. Nor do they alert the florist when their inventory is low and by how much or on what items. This requires a first trip to the machine to determine what items have been sold and then typically a second trip to restock those items.

Further, vending machines do not exist with international capabilities nor is the traditional method of ordering flowers through a florist for international delivery very expedient. Currently customers must pay an extra surcharge for overseas delivery and are still not assured of timely delivery. Obviously there are many instances where timely delivery is of the utmost importance, for example, for funerals.

A listing of prior patents, which may be relevant to the invention, is presented below:

| U.S. Pat. No. | Inventor | Issue Date |
|---|---|---|
| 4,311,227 | Watkins | JAN. 19, 1982 |
| 5,360,134 | Falk, et al | NOV. 01, 1994 |
| 5,386,462 | Schlamp | JAN. 31, 1995 |
| 5,450,938 | Rademacher | SEP. 19, 1995 |
| 5,472,116 | Barbe, et al | DEC. 05, 1995 |
| 5,511,646 | Maldanis, et al | APR. 30, 1996 |

The Watkins U.S. Pat. No. (4,311,227) discloses an automated vending system using a set of climate controlled cubicles, each with a door that is unlocked electronically when it receives the proper signal from a corresponding panel of selection buttons. The system also includes a remote programming panel for adjusting the amount of credit necessary to unlock the door to each cubicle. The signal from the selection button will unlock the door corresponding to that button only if the system's bill reader has received the amount of money required for that door, as set at the remote programming panel.

The Falk U.S. Pat. No. (5,360,134) discloses an automated vending system that uses a cylindrical drum within a cabinet. The drum is divided into compartments by a fixed number of horizontal shelves and a variable number of vertical walls. Each horizontal shelf corresponds to a transparent door in the cabinet and an electronic price display. When the customer actuates the mechanism that rotates the drum, the electronic display shows the price of the goods aligned with the door. When the customer deposits the proper amount of money, the door corresponding to the selection is unlocked electronically to allow access to the goods. The Falk invention is designed to accept coins and bills and to accommodate a climate control system.

The Falk vending system may be programmed to limit the drum's range of motion and those limits may be programmed to change over time. The price of accessing individual compartments may be programmed to change over time, as well.

The Schlamp U.S. Pat. No. (5,386,462) discloses a vending system that uses a computing unit and a fixed number of compartments designed to allow one or more merchants to make goods available to one or more customers after hours. If a customer pre-selects goods from a merchant for pick up after hours, the merchant deposits the ordered goods in a compartment and uses the vending system's input device to associate a "customer number" with that compartment. The customer can unlock that compartment at a later time by entering the same customer number and charging the price of the goods to an account.

The Schlamp vending system also allows the merchant to offer goods for sale to the general public, including a means of advertising the available goods and a means of accepting coins and bills. Furthermore, this vending system allows potential costumers to retrieve the list of available goods remotely using telecommunications and to reserve goods using a customer number.

The Rademacher U.S. Pat. No. (5,450,938) discloses a vending system that ties a single card reader to two or more conventional currency-activated vending machines.

The Barbe et al U.S. Pat. No. (5,472,116) discloses an apparatus for dispensing tickets, as for transportation, to customers. The apparatus includes a screen, a display, a scroll knob, and a confirmation button. The customer selects parameters, such as destination and class, by turning the knob to cause the list of valid parameter values to scroll across the display and pressing the confirmation button when the desired value is highlighted. After the customer has selected all necessary parameters and has paid the necessary price, the apparatus prints and dispenses an appropriate ticket. The apparatus accepts cash and credit cards.

The Maldanis U.S. Pat. No. (5,511,646) discloses a method of programming a vending machine having two or more shelves that circulate on a conveyor belt to align with a horizontally disposed row of access doors.

While the Watkins invention uses climate controlled compartments, and the Falk invention remembers which compartments have been accessed, and the Schlamp invention uses telecommunications to accept orders for on-site pick up, none of these systems allow for the dual role of immediate purchase and receipt of goods and/or immediate purchase with remote delivery at a place and time specified at the time of purchase by the purchaser. Therefore, inter alia, none of the above referenced patents use telecommunications to allow a customer at the vending machine to place an order for remote delivery or to allow the florist to know what items have been sold and removed from the machine without a visual inspection.

It is also known to use the "world wide web" or internet for an automated, computerized process for a customer to place an order using the customer's PC, as well as simple telephonic calling, for placing floral orders through a live operator. However, these approaches do not provide for direct, automated vending and have other disadvantages not present in the automated florist vending and order taking system of the present invention.

GENERAL SUMMARY DISCUSSION OF INVENTION

The present invention allows a walk-up or drive-up customer, using the invention's automated florist system, to select from a variety of pre-made flower arrangements from discrete cells equipped with the necessary refrigeration for immediate purchase. In addition, the system of the present invention is equipped with the hardware and software necessary to allow the customer to select from a variety of floral and/or gift items, enter a name and address to which the item is to be delivered, make payment for the item with cash or credit card (the logos of the credit cards will be displayed in a prominent location), and even communicate with the florist who will be handling the delivery.

The customer data entered can be used, if so desired, by the host florist and supplemented for subsequent use in, for example, direct mail or telephone or e-mail promotions or reminder systems in connection with, for example, annually repeating events, such as, for example, birthdays, anniversaries, etc., for subsequent querying the customer for repeat business. This supplemental use of the customer input data provides valuable marketing information, personalization of future customer contact, historical data, etc., adding substantial business value to the system.

The system of the invention automatically forwards the order to a participating florist, preferably according to postal "zip" code, and will issue the customer a receipt. Special handling procedures preferably will also be available.

The owner of the machine of the invention will be able to access the unit, track inventory, and process credit card payments via, for example, his/her in-house computer. This enables the operator to keep a fresh supply of flowers available in the machine at all times. The daily transaction report typically and preferably has at least the cooler sales, orders sent, and cash and credit card totals. The credit cards can be batched out, for example, on a daily basis.

The invention is adaptable for international applications with the simple addition of language translation software, which is readily available commercially. This would be a significant improvement over the prior art in that even international orders could be placed and delivered within twenty-four hours, without the necessity of a surcharge.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 5 is an exemplary order form screen display for "option 2" of the logic flow chart of FIG. 3.

EXEMPLARY MODE FOR CARRYING OUT THE INVENTION

Figure 1:
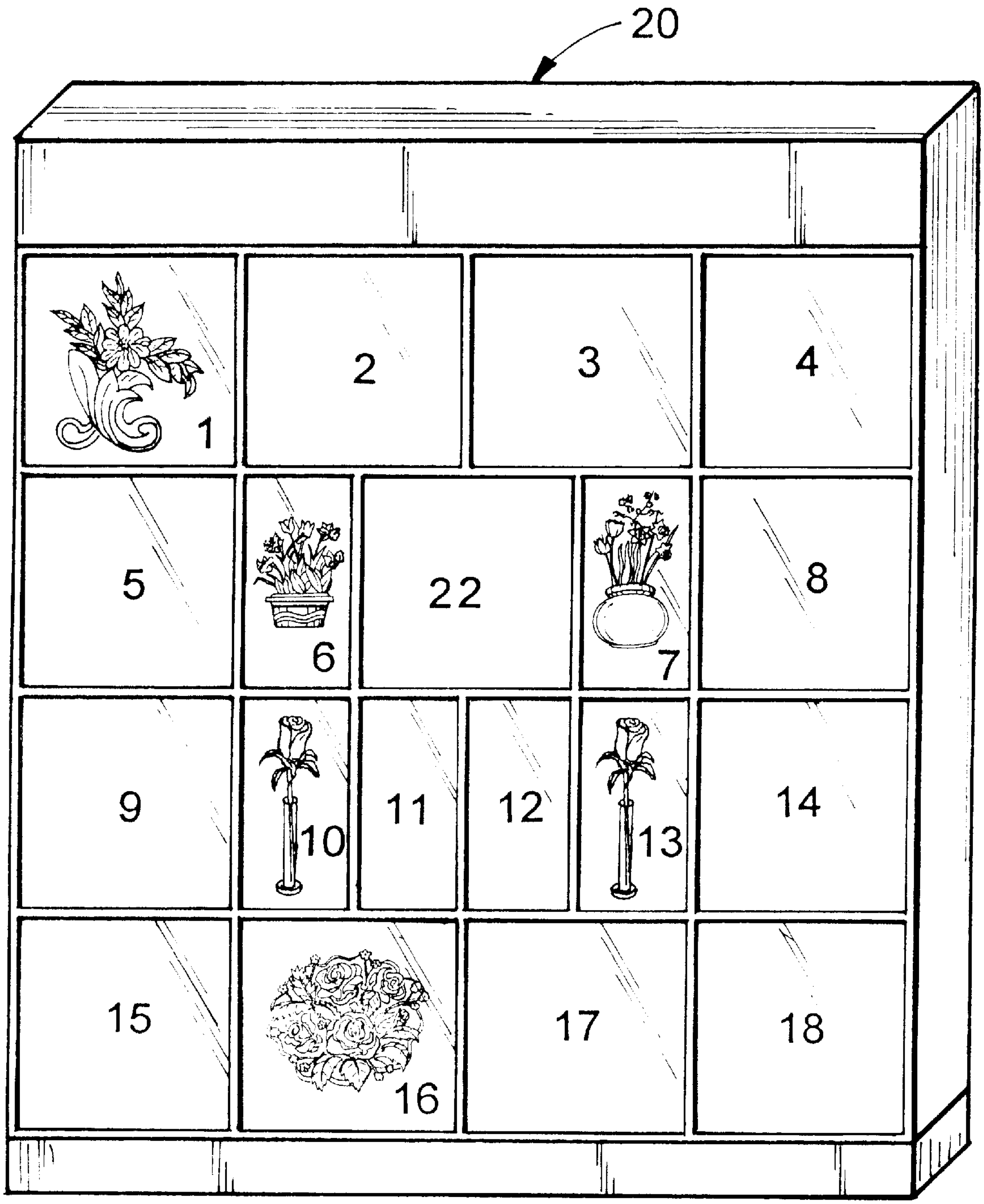
FIG. 1 is a perspective, simplified view of a preferred, exemplary embodiment of a display cooler of the present invention.

The present invention makes available florist products and services at remote locations and on a twenty-four hour, seven day (24/7) basis. As shown in FIG. 1, the present invention is contained in a display cooler 20. The display cooler may be suitable for outdoor display and/or indoor display and may be accessible for walk-up service and/or drive-up service.

The cooler 20 has a plurality of, for example, eighteen discrete cells 1–18, which are refrigerated or not, based upon their contents. The cells 1–18 may contain, for example, flowers, in which case they are refrigerated, or various, non-perishable gift items in which case they would not have to be refrigerated. The presently preferred embodiment utilizes all refrigerated cells for the most versatility.

The display cooler 20 requires a supply of electricity, a computer processor, associated, programmable circuitry and memory, and a telephone line, all as generally known in the art. The exemplary embodiment as shown in FIG. 1, is, for example, eighty-seven (87") inches high, twenty-six (26") inches wide, and ninety-six (96") inches long, weighing approximately six hundred and fifty (650 lbs.) pounds, and uses, for example, one hundred ten (110 V) volts of electricity. Of course, these parameters are exemplary only and are subject to a variety of changes.

Figure 2:
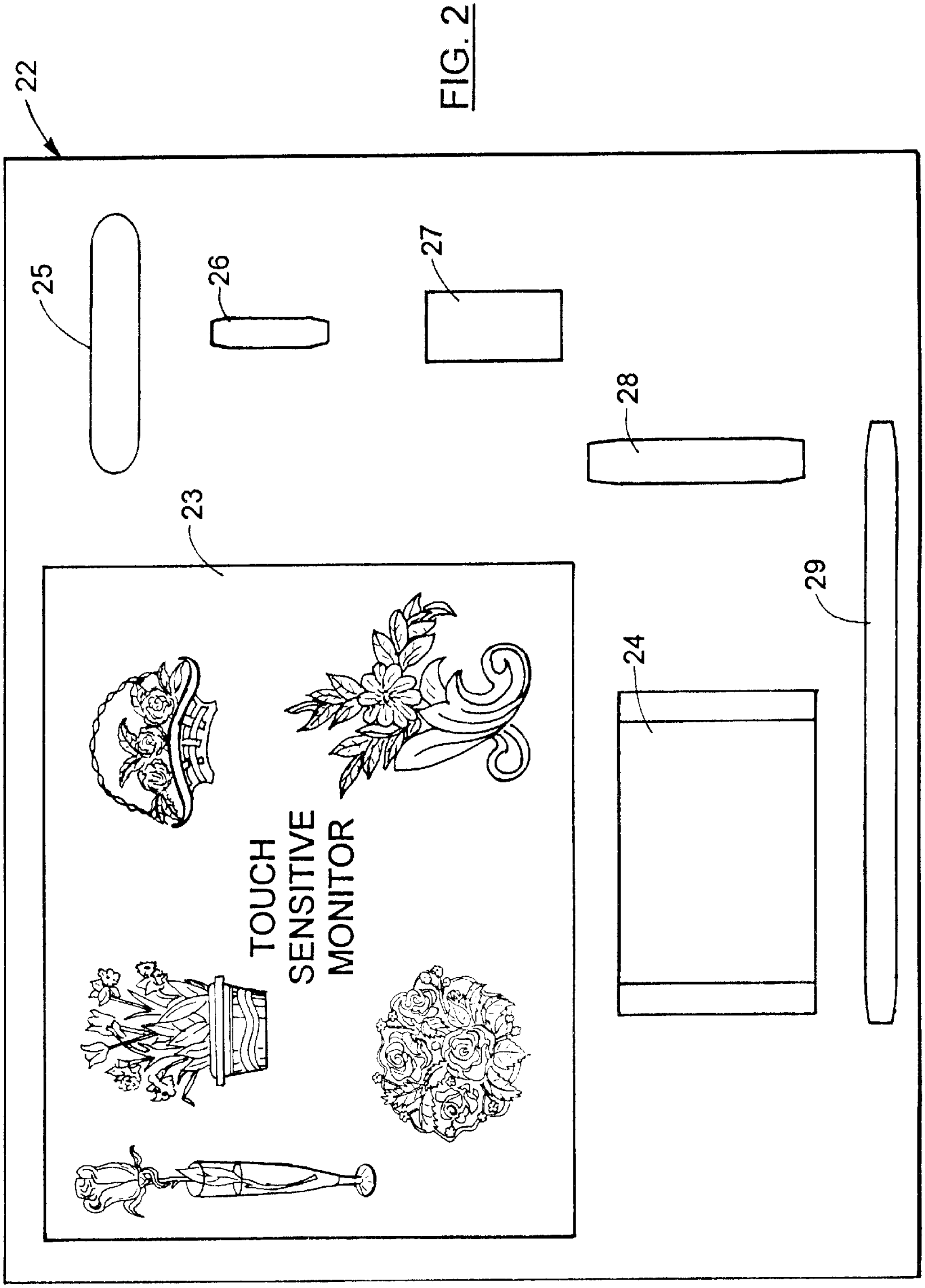
FIG. 2 is a frontal, simplified, detailed or close-up view of the preferred, exemplary embodiment of the "control unit" of the display cooler of FIG. 1.

At the center of the display cooler 20 is a control unit 22 (see FIGS. 1 & 2). The control unit preferably has a touch-sensitive monitor 23 for communicating the necessary information described below to the customer and for allowing the customer to input necessary data. Of course, a conventional keypad and a non-touch sensitive monitor could be substituted, if so desired.

The control unit 22 also utilizes a customer presence detector 24 to alert the computer to the presence of a customer, and allows for various payment options. The payment options preferably include a bill changer 25, for accepting a variety of denominations of bills, a coin acceptor slot 26, a coin return 27 for making change, and a credit card insertion slot 28 for accepting credit cards. Through these units the customer may make payment for his/her purchase with cash or credit card.

Figure 3:
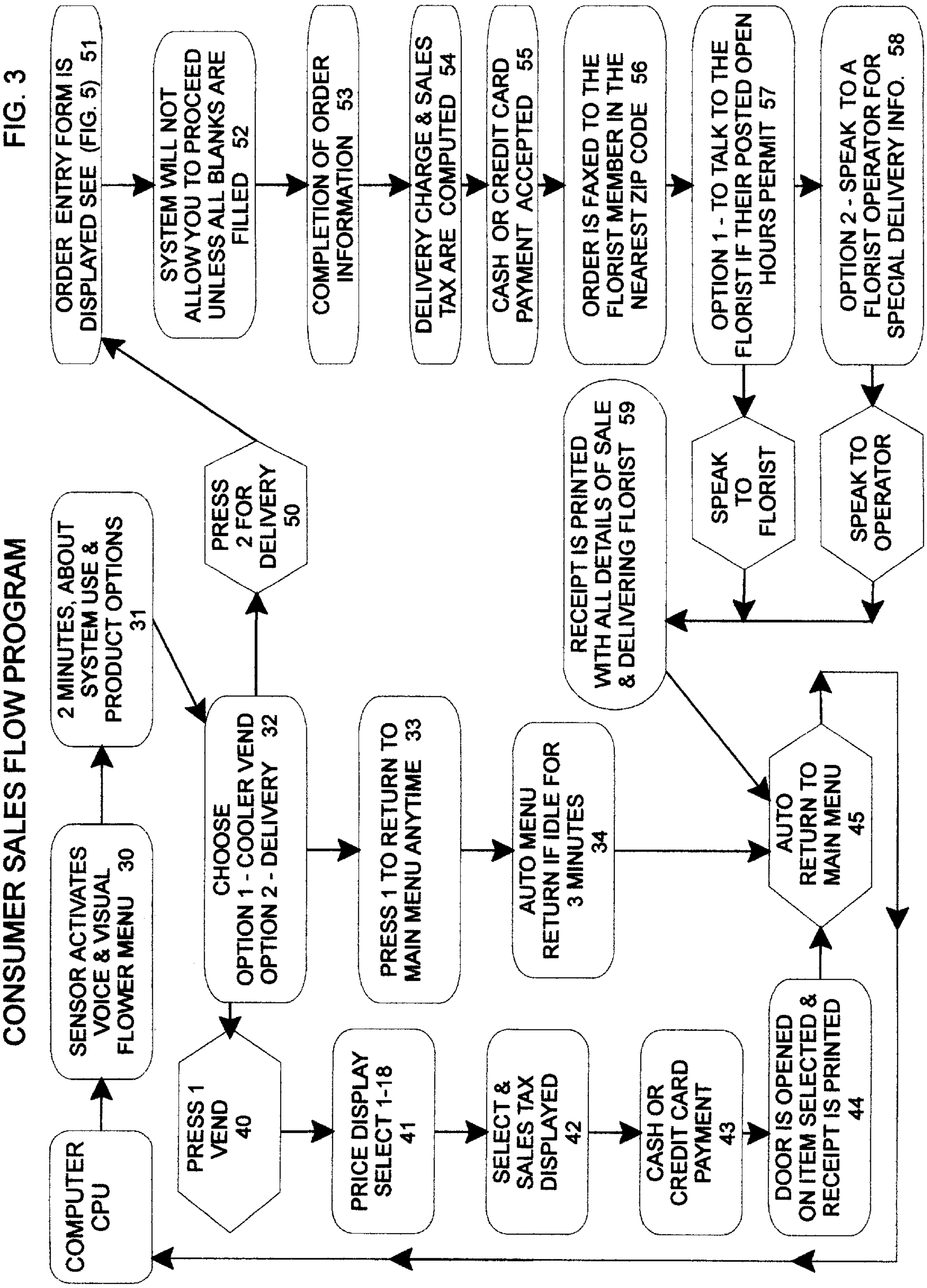
FIG. 3 is a schematic block diagram or logic flow chart of the preferred, exemplary embodiment for the consumer sales flow program for the program logic or algorithm for the programmable control circuitry of the present invention.

In operation, the system of the present invention gives a customer a variety of menu choices when he/she approaches the display cooler 20. As schematically represented in the logic flow chart of FIG. 3, the computer processor is prompted (step 30) by the customer presence detector 24.

This prompt begins an approximately two (2) minute long set of instructions about using the system and its purchasing options (step 31). These instructions may be by-passed by the user at any given time, and the customer may either directly proceed with a purchase or go back to the main menu.

After the instructions are over, the customer is given a choice (step 32) of "option 1", namely, purchasing an item for immediate sale out of one of the display cooler cells (1–18), or "option 2", namely, choosing an item for remote delivery (note FIG. 5). In the event that the customer makes no choice, or walks away, the computer will automatically return the system to the main menu if it has been idle for a set period of time (step 34); for example, three (3) minutes. In addition, the customer is given the option of returning to the main menu (step 33) at any time during the operation of the vending system, which would start the customer over from the beginning, canceling any previously input information.

If the customer chooses "option 1" (step 40), by pressing an identified "button", a price display (step 41) for the various items in the display cooler is shown, and the customer is instructed to choose one or more items for purchase. Once the customer has selected the desired item (s), a display showing the price and sales tax (step 42) will appear. The customer is instructed or informed of their payment options, cash or credit card (step 43), and, once the payment transaction is complete, the appropriate cell door(s) is/are opened (step 44), and the customer may remove the selected item(s). The system prints a receipt at slot 29 for the customer's purchase (2nd part of step 44), and then the computer automatically returns to the main menu (step 45).

If the customer chooses "option 2" (step 50), by pressing an identified "button", an order entry form (step 51) is displayed, it being noted that an exemplary form is illustrated in FIG. 5. The customer must input the required information, namely, for example, the name, address, telephone number, "zip" code, delivery date, card message, for the desired delivery, as well as the customer information, or the system preferably will not allow the procedure to proceed (step 52).

Once the order information is completed (step 53), the price, delivery charge, and sales tax are computed (step 54). As in "option 1", the customer is instructed or informed of their payment options (step 55), cash or credit card. Once the payment transaction is complete, the order preferably is faxed (step 56) to the appropriate associated florist, with the associated florist chosen by, for example, a postal "zip" code comparison to the "zip" code of the indicated desired delivery location.

The customer is also given the option to talk to the delivery florist if the florist's posted hours permit (step 57). If the delivery florist is closed, then the customer is given the option to talk to a florist operator affiliated with the host florist, if it is not closed, or, optionally, to a twenty-four hour available operator affiliated with, for example, the supplier of the computerized cooler system 20, to communicate any special delivery information (step 58). If the customer chooses not to speak with anyone, or after he/she has spoken to the florist or operator, the programmed computer causes a receipt to be printed for the purchase (step 59) that preferably includes all of the details of the sale and the delivering florist information, as well as, optionally, the host florist, and then returns to the main menu screen (step 60).

Figure 4:
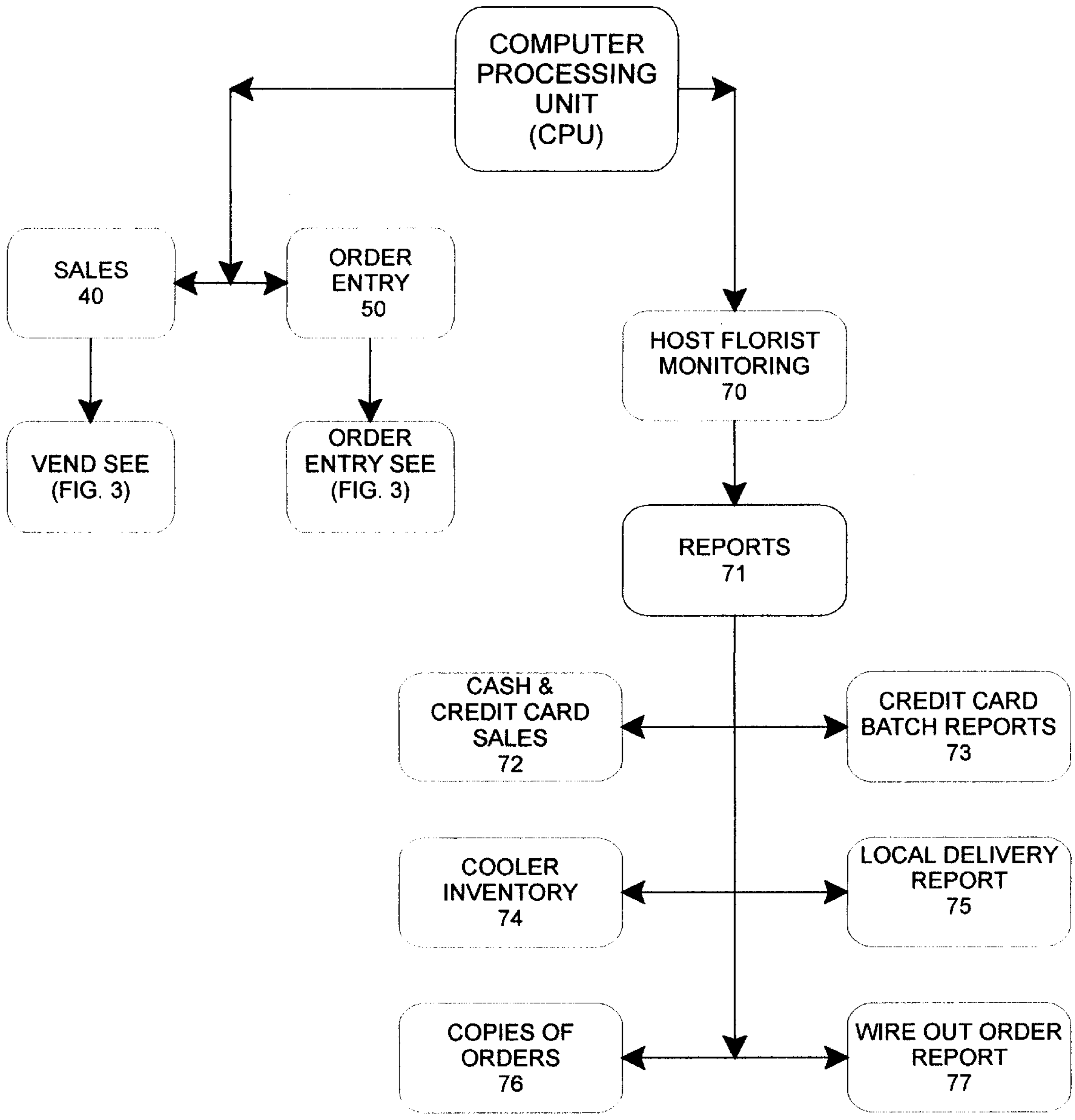
FIG. 4 is a schematic block diagram of the preferred, exemplary embodiment for the host florist data program structure for the programmable control circuitry showing information available and functional capabilities of exemplary, preferred embodiment of the present invention.

Additional features of the present invention help the host florist access information on the sales handled by the vending system via, for example, remotely using a modem telecommunications hook-up, using computerized equipment well known in the art. As shown in FIG. 4, the host florist may both monitor (70) the vending system and generate reports (71). Among the preferred capabilities of the vending system of the invention are the ability to monitor cash and credit card sales (72), generate credit card batch reports (73), monitor the display cooler inventory (74), generate local delivery reports 75, generate copies of all orders placed at the vending system 76, and send out order reports 77 to associated florists. In essence, the host florist will be able monitor and conduct all business for the vending system from the remote florist shop with the exception of restocking the inventory in the display cooler 20.

Figure 6:
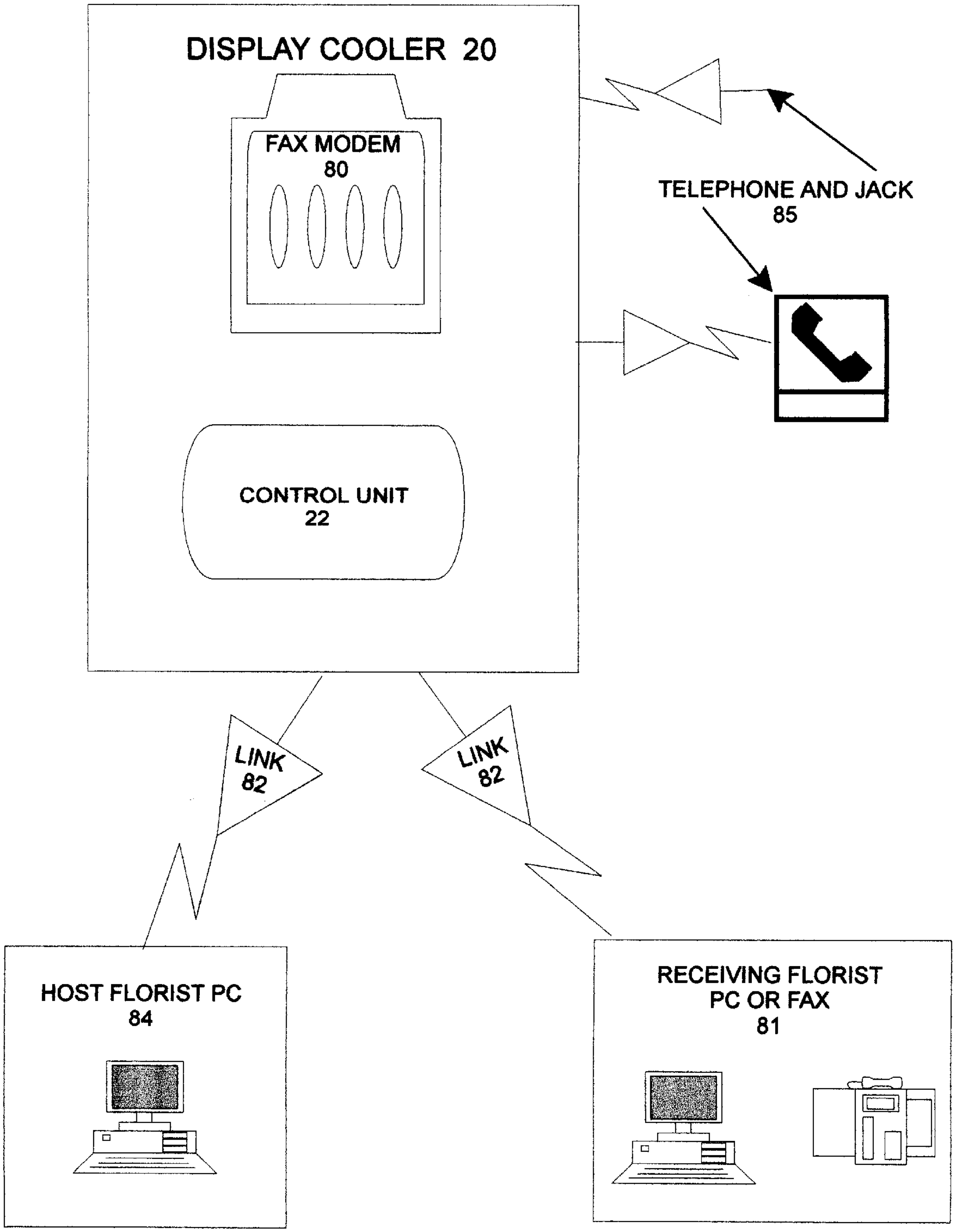
FIG. 6 is a simplified, schematic block diagram of the preferred, exemplary embodiment of the over-all system of the present invention, illustrating in schematic form the automated order forwarding communications to an associated florists, as well as the remote data access communication for the host florist for the data outlined in FIG. 4.

As can be seen in FIG. 6, the over-all system for the automated florist delivery system of the invention, includes not only the display cooler 20 with its computerized control unit 22 discussed above, but also an integrated, fax/data modem 80 used to communicate the order data to the associated florist's shop 81 for delivery of the order to the distant location, using an appropriate data communication link 82.

This link 82 typically can be the telephone ("TelCo") system, using plain, old telephone system ("POTS") lines, with the data being transmitted, for example, in "fax" or facsimile form. Alternatively, for further example, the communication link 82 could be "wireless" rather than by "hard wire" or include an appropriate link to the internet or "world wide web" for down-loading or "e-mail" forwarding of the "order" data to the associated florist's shop 81, or the telecommunication links of various organizations, such as "FTD" or "TeleFlora", etc., could be used.

Likewise, the over-all system includes an appropriate communications link 83 to the host florist's shop or other pertinent location 84, to allow the host florist to access or receive the data being accumulated and stored in the "memory" (e.g., in a removable or fixed "hard disk") contained in the cooler system 20 and associated with the control unit 22. Regardless of what type of communications links 82, 83 are used, it preferable that a telephone link or jack 85 still be included in the system to allow for the "direct" telephonic communication between a customer and the florist (associated or host as appropriate) or other pertinent operator.

It is noted that typically the home location of the host florist, i.e., where the florist's florist shop is located, will be located a significant distance from the display cooler 20, usually the equivalent of at least a few city blocks and more usually a matter of some miles from the display cooler(s) the florist is operating. Likewise, the location for remote delivery of a customer order is typically to a location substantially away from the location of the display cooler 20, typically a number of miles and potentially hundreds and even thousands of miles away.

It is further noted that the system of the present invention is appropriate for both national and international usage. In the event that an international order is made, appropriate language translation software, which is commercially available, would be utilized to automatically make what ever language conversions might be necessary in transmitting, for example, the "order" information or data to an associated florist in the foreign country into which the delivery of the floral arrangement or gift is to be made.

Credit card security algorithms and other general security items can be added to the logic of the control system or the over-all system, to track, catch and thwart fraudulent card usage and/or vandalism.

For example, a video or still digital camera could be included in or separately located adjacent to the cooler display unit 20, storing and/or sending digital images over the telecommunications link 83 for data recording and/or supervisory image viewing at, for example, the host florist's site 84. This camera subsystem produces digital image information, typically of the area in front of the display cooler 80 and sends the digital image information over the telecommunications link 83 to the host florist's site 84.

Additionally, based on either prior "bad" use of the subject credit card previously at one of the host florist's systems or information received from the credit card issuer or a credit reporting agency, the usual control unit logic could be automatically by-passed and the credit card user (potentially a fraudulent or delinquent user) "locked out" of the use of the cooler system 20.

It should be noted that, in using the phrase "credit card" in this specification, such is intended to include both "credit" and "debit" type cards and the like, wherein a card, typically plastic, is used in order to effectively make payment for an item without directly using cash money or other forms of legal tender or barter for payment. Typically the card will be issued by a financial institution to the customer under an appropriate financial arrangement, in which the card issuer pays the vendor (here the host florist) and the issuer in turn receives payment from the customer or otherwise obtains payment from a customer asset, such as the customer's checking account.

The present invention may, of course, be carried out in other specific ways than those herein set forth without departing from the spirit and essential characteristics of the invention. The present exemplary embodiment is, therefore, to be considered as illustrative and not restrictive.

Thus, it is further noted that the embodiment(s) described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements ot the law, it is to be understood that the details herein are to be interpreted as illustrative and not in a limiting sense.

What is claimed is:

1. A computerized, automated florist system, for use at a customer ordering location remote from a florist shop, providing twenty-four hour, florist-like services using a number of remotely located, associated florists for remotely located deliveries, comprising:

a display and dispensing cooler having discrete cells for displaying for viewing at least pre-made flower arrangements and being equipped with refrigeration to cool the pre-made flower arrangements and located away from any human vending flower operation; and an order taking control unit physically associated with said cooler for automated vending, order placement and order fulfillment assignment specifically for at least flower arrangements and gift items, said order taking control unit being pre-programmed using computer logic, allowing a human customer located adjacent to said cooler to select from a variety of pre-made flower arrangements located in said discrete cells for immediate purchase without the need for vendor human intervention or assistance, or, alternatively, a selection may be made, and information entered, for remote delivery at a specified, distantly located place of an ordered item using credit card or other smart card or other financial authorization, again without the need for vendor human intervention or assistance at said cooler, with said order taking control unit itself, in the case of an order for remote delivery of the customer selected item at a customer specified, distantly located place, assigning an associated florist for fulfillment of the order for actually making the remote delivery at the customer specified, distantly located place.

2. The automated, computerized florist system of claim 1, wherein said display cooler is serviced by a host florist shop located some significant distance of at least some blocks from the physical location of the host florist, and wherein there is further included a monitoring unit associated with said order taking control unit comprising:

electronic, computerized equipment including report and monitoring logic programming, allowing a operating, host florist associated with the display and dispensing cooler to remotely monitor and conduct all business directly concerned with the cooler from the operating florist's shop, except for the stocking of said display cooler with items for immediate purchase.

3. The automated, computerized florist system of claim 2, wherein said order taking control unit further comprises:

electronic equipment including a camera subsystem producing digital image information of the area in front of said display cooler and located in associated with said display cooler and sending said digital image information over said telecommunications link to the host florist's site.

4. The automated, computerized florist system of claim 1, wherein said order taking control unit further comprises:

electronic, computerized equipment including order forwarding report logic programming, causing the sending of an order to an affiliated florist for a distant delivery to be automated.

5. The automated, computerized florist system of claim 1, wherein said order taking control unit further comprises:

electronic, computerized equipment including order processing logic programming, allowing the customer to select from a variety of floral and/or gift items, enter a name and address to which the selected item is to be delivered, and make payment for the item with cash or credit or other smart card.

6. The automated, computerized florist system of claim 5, wherein said order taking control unit further comprises:

electronic, computerized equipment including order processing logic programming and associated telecommunication equipment, allowing the customer to speak directly to the florist assigned to the delivery of the selected item to the address entered by the customer.

7. The automated, computerized florist system of claim 1, wherein said order taking control unit further comprises:

electronic, computerized equipment including order processing logic programming and associated data storage equipment, causing the data provided by the customer and the customer's credit or other smart card to be stored, subsequently retrieved and used for future marketing purposes for repeat business with that customer.

8. The automated, computerized florist system of claim 1, wherein said order taking control unit further comprises:

electronic, computerized equipment including order processing logic programming and associated telecommunication equipment, assigning the delivery of the selected item to a remote florist for making the delivery of the selected item, taking into account "zip" code data of the delivery point and the "zip" code of the florist to which the order is assigned.

9. The automated, computerized florist system of claim 1, wherein said order taking control unit further comprises:

electronic, computerized equipment proximate to said cooler including order processing logic programming and associated telecommunication equipment, allowing the host florist to access the unit by said telecommunication equipment and thereby track inventory, and process credit or other smart card payments via a computer located at the host florist site and further enabling the host florist to keep a fresh supply of flowers available in the machine at all times.

10. The automated, computerized florist system of claim 9, wherein said order taking control unit further comprises:

electronic, computerized equipment including order processing logic programming capable of generating a timely transaction report including at least the following data since at least the last transaction report—itemized cooler sales, itemized orders sent via telecommunications, and cash and credit/smart card totals.

11. The automated, computerized florist system of claim 1, wherein said order taking control unit further comprises:

electronic, computerized equipment including order processing logic programming allowing for international deliveries of the selected item(s), said programming including language translation software.

12. The automated, computerized florist system of claim 1, wherein said order taking control unit further comprises:

electronic, computerized equipment including order processing logic programming, said computerized equipment including a computer processor, associated, programmable circuitry and memory, including both RAM and long term storage memory, a telephone line link, and an electrical power supply.

13. The automated, computerized florist system of claim 1, wherein said order taking control unit further comprises:

electronic, computerized equipment including customer presence detector and associated logic programming, which alerts the computer equipment to the presence of a customer in front of said display cooler and which provides information and instructions to the customer about using the system and its purchasing options.

14. The automated, computerized florist system of claim 1, wherein said order taking control unit further comprises:

electronic, computerized equipment including order processing logic programming, said computerized equipment including a touch-sensitive monitor for communicating order placing information to the customer and for allowing the customer to input ordering data.

15. The automated, computerized florist system of claim 1, wherein said order taking control unit further comprises:

electronic, computerized equipment proximate to said cooler including automated means which automatically faxes the order information for a remote delivery of a customer selected item to an associated florist assigned by said order taking control unit to handle the remote delivery.

16. The automated, computerized florist system of claim 1, wherein said order taking control unit further comprises:

electronic, computerized equipment proximate to said cooler including a telephonic link allowing a customer who orders an item for remote delivery to talk directly to the associated florist assigned by said order taking control unit to fulfill the remote delivery of the customer selected item.

17. The automated, computerized florist system of claim 1, wherein said order taking control unit further comprises:

electronic, computerized equipment proximate to said cooler including a printer which prints out the details of an order involving a remote delivery of a customer selected item including information identifying for the customer the associated florist assigned to fulfill the remote delivery.

18. A method of automatically vending flowers, gift items and other items at a location significantly away from a florist's site, comprising the steps of:

(a) using an automated ordering system including a display and dispensing cooler having discrete cells for displaying for viewing at least pre-made flowers arrangements and being equipped with refrigeration to cool the pre-made flower arrangements and being located away from any human vending flower operation, and an order taking control unit physically associated with said cooler for automated vending and order placement specifically for at least flower arrangements and gift items, said order taking control unit being pre-programmed using computer logic, allowing a human customer located adjacent to said cooler to select from a variety of pre-made flower arrangements located in said discrete cells for immediate purchase without the need for vendor human intervention or assistance, or, alternatively, a selection may be made, and information entered, for remote delivery at a specified, distantly located place using credit card or other smart card or other financial authorization, again without the need for vendor human intervention or assistance at said cooler;

(b) having said order taking control unit programmed to allow the customer physical access to the appropriate display cell containing a customer selected item after an acceptable financial payment arrangement has been made, and having it programmed to directly transmit electronically the order data, after an acceptable financial payment arrangement has been made, to the location of a remotely located, associated florist determined and assigned by the order taking control unit itself for the fulfillment of a customer placed order involving the remote delivery of a customer selected item to a location at a substantial distance from said display cooler.

19. The automatic flower vending method of claim 18, wherein, when the customer places an order for a remote delivery, there is included in step "b" the further step of the order taking control unit faxing a copy of the order information directly to the remotely located, associated florist assigned to fulfill the delivery of the customer selected item.

20. The automatic flower vending method of claim 18, wherein, when the customer places an order for a remote delivery, there is included in step "b" the further step of allowing the customer to talk directly to the remotely located, associated florist, who has been assigned to fulfill the remote delivery of the customer selected item by the control unit, via a telephonic link from the location of the display and dispensing cooler directly to the associated florist.

21. The automatic flower vending method of claim 18, wherein, when the customer places an order for a remote delivery, there is included in step "b" the further step of printing a receipt for the customer at the time of the order that includes the details of the sale and information identifying the delivering florist assigned to fulfill the remote delivery of the customer selected item.

22. A method of automatically vending flower arrangements, gift items or other items at a location significantly away from a florist's site for delivery of a customer selected item to a customer determined remote location at least a number of miles away from where the customer is located when placing the order, comprising the steps of:

(a) providing an automated ordering system for use by the customer including an order taking control unit for automated order placement by the customer specifically for a customer selected item, said order taking control unit being pre-programmed using computer logic, allowing the customer located adjacent to said control unit to select and enter information for remote delivery of the customer selected item at a specified, distantly located place determined by the customer, using credit card or other smart card or other financial authorization to pay for the order, without the need for vendor human intervention or assistance at said unit;

(b) having said order taking control unit programmed to allow the customer to place an order for a customer selected item for remote delivery determined by the customer of the customer selected item, and having said order taking control unit further programmed to transmit electronically the order data, after an acceptable financial payment arrangement has been made, to the location of a remotely located, associated florist determined and assigned by the order taking control unit itself for fulfillment of the customer placed order involving the remote delivery of the customer selected item to the customer determined location located at a substantial distance of at least a number of miles from said order taking unit wherein the order taking control unit is programmed to allow the customer to talk directly to the remotely located, associated florist, who was assigned by the control unit to fulfill the remote delivery of the customer selected item, via telephonic link from the location of the order taking control unit to the associated florist.

23. The automatic flower vending method of claim 22, wherein there is included in step "b" the further step of having the order taking control unit programmed to fax the order information directly to the remotely located, associated florist assigned by the control unit to fulfill the remote delivery of the customer selected item.

24. The automatic flower vending method of claim 22, wherein there is included in step "b" the further step of having the order taking control unit programmed to automatically print a receipt for the customer at the time of the order that includes the details of the sale and information indentifying the delivering florist assigned by the control unit to fulfill the remote delivery of the customer selected item.

* * * * *